March 16, 1926.

I. S. HANSON

POWER DEVELOPING APPARATUS

Filed Jan. 20, 1923

1,576,653

WITNESSES:
W. S. Beckley

I. S. Hanson
INVENTOR

BY D. C. Davis
ATTORNEY

Patented Mar. 16, 1926.

1,576,653

UNITED STATES PATENT OFFICE.

IVAN S. HANSON, OF WINTER HARBOR, MAINE, ASSIGNOR TO WESTINGHOUSE ELECTRIC AND MANUFACTURING COMPANY, A CORPORATION OF PENNSYLVANIA.

POWER-DEVELOPING APPARATUS.

Application filed January 20, 1923. Serial No. 613,985.

*To all whom it may concern:*

Be it known that I, IVAN S. HANSON, a citizen of the United States, and a resident of Winter Harbor, in the county of Hancock and State of Maine, have invented a new and useful Improvement in Power-Developing Apparatus, of which the following is a specification.

My invention relates to elastic fluid turbines and machines driven thereby and it has for its object to provide apparatus of the character designated which shall have only two bearings for the support of the turbine and the machine rotors, whereby the structure may be simplified, be economically built, and have the bearings easily alined.

A further object of my invention is to provide a two-stage turbine with a single bearing between the stages.

A still further object of my invention is to provide a multi-stage turbine of the impulse type wherein the blade-supporting disk of the first or high-pressure stage is overhung with respect to a supporting bearing.

Figure 2:
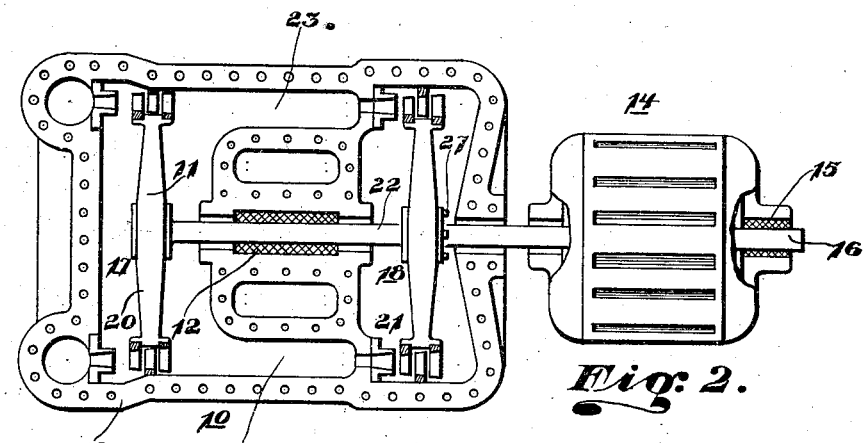
Figure 1:
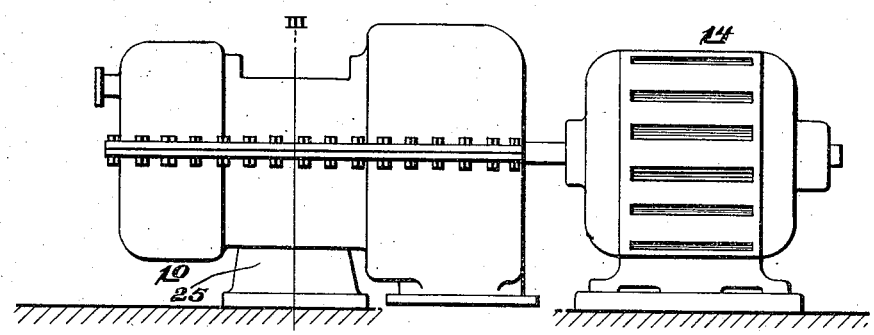
Figure 3:
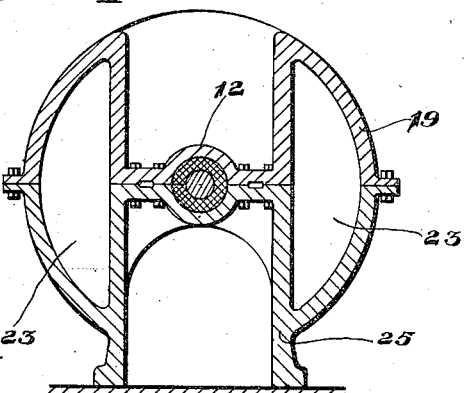

Apparatus made in accordance with my invention is illustrated in the accompanying drawings, forming a part of this application, in which: Fig. 1 is a side elevation of my improved turbo-generator set; Fig. 2 is a plan view of the apparatus shown in Fig. 1 with the turbine cover removed and showing parts in section; and Fig. 3 is a sectional view taken along the line III—III of Fig. 1.

Referring to the drawings for a more detailed description of my invention, I show a turbine, at 10, having a rotor 11 carried by an intermediate bearing 12 and which is connected to a driven machine, for example, the rotor of a generator 14, having a single outer bearing 15 for the rotor shaft 16.

The turbine preferably comprises high and low-pressure stages, at 17 and 18, carried by a casing structure 19 and by disks 20 and 21 secured to the rotor shaft 22. The casing structure is provided with passages 23 extending in an axial direction for conducting motive fluid exhausted from the high-pressure stage, at 17, to the low-pressure stage, at 18.

The turbine, at 10, is supported by a pedestal 25 which carries the bearing 12 at its upper end. The casing structure 19 is supported by said pedestal.

The generator shaft 16 is preferably provided with a flange 27 which is secured to the rotor disk 21.

From the foregoing, it will be apparent that the turbine and generator rotors are supported by a single pair of bearings, namely, the turbine bearing 12 and the generator bearing 15. It will also be seen that the disk 20 of the high-pressure stage, at 17, is overhung with respect to the intermediate turbine bearing 12. It will, therefore, be apparent, that I have devised a turbine and machine driven thereby which is simple from the standpoint of structure and in which it is assured that the generator and turbine shafts shall be maintained in alinement, thereby avoiding the necessity for using compensating couplings. My arrangement also makes it possible to shorten the overall length of a turbine and a generator of the character referred to with respect to structures of the prior art.

While I have shown my invention in but one form, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. In an elastic-fluid turbine, the combination of a casing, a rotor within the casing and having blade-carrying disks and a single bearing for the rotor arranged between the disks.

2. In an elastic-fluid turbine, the combination of a casing, a turbine shaft within the casing, blade-carrying disks carried by the shaft at the ends thereof, and a single bearing for the shaft between the disks.

3. In a turbine and machine driven thereby, the combination of a turbine shaft, blade-carrying disks carried by said shaft, a bearing for the turbine shaft disposed between the disks, a machine shaft, means for securing one end of the machine shaft to one of the disks, and a bearing for the other end of the machine shaft.

4. In power-developing apparatus, the combination of a turbine having high and low-pressure sections, a bearing for the rotor of the turbine disposed between the sections, driven apparatus including a shaft, means for connecting one end of the shaft to the rotor, and a bearing for other end of the shaft.

5. In power-developing apparatus, the combination of a turbine having a rotor, a driven machine having a rotor, the rotors of the turbine and of the driven machine being coupled together, a single supporting bearing disposed between the ends of the turbine rotor, and another supporting bearing at the outer end of the rotor of the driven machine.

6. In a power-developing apparatus, the combination of a two-stage turbine, a driven machine having a rotor coupled to the rotor of the turbine, and two bearings for the rotors, one bearing being disposed between the turbine stages and the other bearing disposed at the other end of the driven machine rotor.

In testimony whereof, I have hereunto subscribed my name this 6th day of Jan. 1923.

IVAN S. HANSON.